March 5, 1963 R. MILLE 3,079,638
APPARATUS FOR THE INJECTION OF PLASTIC MATERIALS
Filed Aug. 3, 1959 3 Sheets-Sheet 1

INVENTOR:-
RAYMOND MILLE

INVENTOR
RAYMOND MILLE

United States Patent Office 3,079,638
Patented Mar. 5, 1963

3,079,638
APPARATUS FOR THE INJECTION OF PLASTIC MATERIALS
Raymond Mille, 41 Rue Liandier, Marseille, France
Filed Aug. 3, 1959, Ser. No. 831,203
2 Claims. (Cl. 18—30)

This is a continuation in part of my co-pending U.S. Patent application Serial No. 600,516 filed 27th July 1956, now abandoned.

The present invention relates to an apparatus for injecting materials in a plastic condition, e.g. thermoplastic, polymerizable thermosetting, or rubberlike vulcanizable thermosetting materials.

Many injection machines have been proposed and most of them are concerned with the use of individual thermoplastics which are made plastic by heating and become again stiff by cooling, exclusive of any setting. Others are concerned with the polymerizable thermosetting materials, especially those whose polymerization temperature is for example about 200° F. higher than the temperature at which they become conveniently plastic. A small number of machines are concerned with rubberlike vulcanizable materials, and each of them is designed for very special uses. According to their ingredients and formula, the rubber compounds become plastic at about from 140° to 160° F.; their plasticity increases with the temperature, but at about 250° F. great risk of scorching occurs. At about 300–350° F., risks of decomposition occur: consequently, the risk of binding the machine, following an untimely scorching, is high. Generally speaking, the rubber injection machines use the material in a cold state. Consequently, the machines have for their main technical effect the plasticizing of the material, at a distance from the pressure means. The injection offers only secondary difficulties and indeed the injection needs only low power when the material has been rendered plastic.

The types of the machines previously proposed divide in two kinds, i.e. screw machines, more or less arising from the well-known extruding machines, and piston machines.

In the screw machines, the material is admitted in a convenient stiff state and runs along the threading of a revolving worm which rotates inside a cylinder. The material is heated by the rolling, the rubbing, and by the contact with the heated cylinder wall. It comes into a heated compression chamber and is driven out through a nozzle. In many cases, the extrusion through the nozzle is used to overheat the material. The pressure above the nozzle is much higher than the one below it, and the working of the pressure during the passing of the constricted nozzle is changed into internal heat within the material. Machines of this type allow to obtain pressures up to from 8,000 to 12,000 lb./sq.i. They do not suit rubberlike materials, because the material remains in the compression chamber. The temperatures are not homogeneous, and scorching occurs almost inevitably.

In the piston machines, the piston has hitherto always had a single straight stroke. If the material becomes plastic in front of the piston, it binds the machine. Therefore, it was hitherto not possible to use the rubberlike materials in a plastic condition. The material placed before the piston was necessarily in a convenient stiff condition. Huge pressures were needed for causing the material to become plastic by passing through a constricted nozzle, of .1" diameter, or less. The trial pressures used with rubber have been 20,000 to 35,000 lb./sq. in. For some plastic non rubber-like materials, the pressures used have been up to 90,000 lb./sq.i. The machinery is thus cumbersome, heavy, and expensive.

The present invention uses materials which are previously brought into a state of high plasticity, this state being obtained by common means, usually by heating. In this state, the injection is simple provided that the necessary arrangements have been made to prevent the binding of the thrusting means.

The accompanying drawings show diagrammatically and by way of example an injection moulding machine in accordance with the invention.

Figure 1:
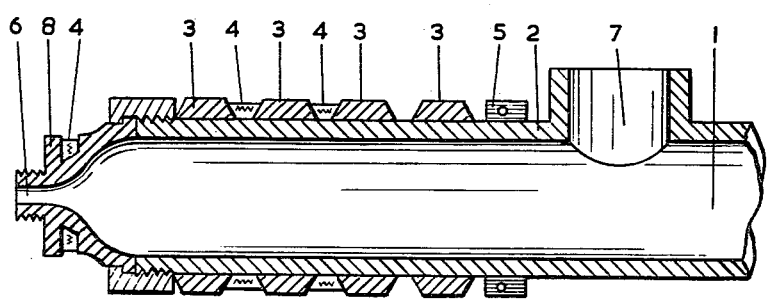
FIG. 1 is a central vertical section of an injection cylinder.

FIG. 1 shows in longitudinal section a cylindrical chamber 1 having a barrel 2 carrying externally reinforcing bands 3 near which are disposed, at the front, the heating resistances 4, and at the rear a cooling fluid flow circuit 5; at the front there is an ejection orifice 6 and at the rear a charging orifice 7. The element 8 carrying the ejection orifice is shown as being removable for the purpose of emptying the apparatus.

Figure 2:
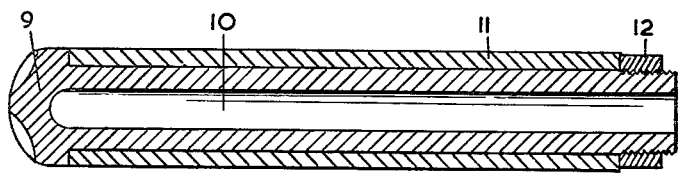
FIG. 2 is a central vertical section of an injection piston for the cylinder of FIG. 1.

FIG. 2 shows in longitudinal section a piston composed of a metal body carrying a specially shaped head, 9 (see FIGS. 4 and 5) said body having a central channel 10 for cooling liquid to flow through. The body of the piston is enclosed in a sleeve 11, and a nut 12 threaded onto pre-stressing.

The mechanical play between the piston and the chamber can be reduced to a value of some hundredths of a millimetre, eliminating the major risks of flow under pressure, by means of a suitable construction.

In the course of use, the internal pressures, which may be for example from 50 to 100 kg./cm.$^2$ for certain elastomers, but which can also exceed these values if circumstances require it, would increase these plays and cause blockages, if suitable arrangements were not made.

These arrangements which arise not only from the application of the pre-stressing but also from the choice and treatment of the materials are as follows:

The compression chamber is constituted by an internal lining 2, submitted to pre-stressing by means of one or more external bands 3, juxtaposed or superposed; the placing in position of these bands 3 is performed either by heating the bands, or by cooling the chamber (for example in a liquefied gas such as nitrogen or air), or by combining the two methods. As is usual in the designing of bands, it is sufficient to make the internal lining in order to resist the locking pressure in such a manner that this pressure is greater than the forces of expansion which could arise from the unitary pressure on the material, in order to avoid any increase of diameter of the chamber in the course of use;

In order to avoid the diameter of the piston increasing under the action of longitudinal forces, it is submitted to a longitudinal pre-stressing. The head 9 of the piston is carried on the body of the piston. The sleeve 11 is clamped between the head 9 and the nut 12 threaded on the extremity of the rod. Whilst reserving suitable tolerances for adjustment, and by using heating and cooling as given above, a longitudinal compression will be exerted on the body of the piston; the calculation can be carried out in such a manner as to avoid any increase of the diameter of the piston in the course of use. For pistons of considerable diameter, the tension rods can be for example multiple instead of single rod.

The tendency to flowing of the material in the plastic state and the plastic state itself generally depend on the temperature. One is therefore forced to maintain the material, for as long as it is in contact with the head of the piston, at a temperature such that the flowing under pressure is not readily produced. By way of indicative example 25 to 30° for rich and well-settled natural rubber; 5 to 8° for a mixture of artificial rubber of the GR-S type; less than 15° for vinyl chloride to which 30 to 40% of butyl phthalate has been added.

The cooling is assured by any usual means, and by way of non-limiting example, by one of the following means:

Use of the direct contact of the head 9 with the material initially cooled, the material deposited in the front of the chamber being on the contrary suitably heated;

Artificial cooling of a part of the head 9, by means of an internal circulation of a fluid refrigerant, for example fresh water, brine, cold air, expansion of a compressed or liquefied gas, or of portions of solidified gas such as carbonic acid gas; on the other hand for its proper estimation, and by analogous means, cooling of the rear part of the compression chamber, by means of suitably disposed channels 5; the rear part of the compression chamber can be thermally insulated from the forward part by means of an intermediate member of good rigidity such as a laminated material on a paper base or textile and formo-phenolic resins.

Fixing to the head 9 of an element constituted by a suitably cooled material, in such a manner as to make it play the role of a squeegee avoiding all flowing of the heated material situated in front. This portion of material can be kept cold by the cooling of the head 9.

Figure 5:
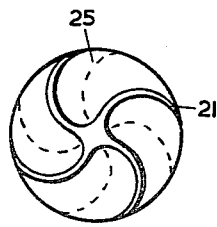
FIG. 5 is an end view of FIG. 4.
Figure 4:
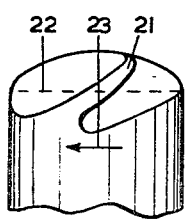
FIG. 4 shows in side elevation an example of the formation of the head of the piston of FIG. 2 or FIG. 3.

With a view to assuring the reassembly, towards the centre and in front, of the particles of material presented against the wall of the chamber, and the sweeping of the particles which could be found adhering to this wall, the head of the piston is shaped in a suitable form. FIGS. 4 and 5 give an example of shaping of the head of the piston. In this example, the general shape is convex, notched with spiral threads the threads communicating through their hollows with the cylindrical wall of the piston in such a manner as to collect, agglutinate and bring towards the centre, in order to sweep them forward, the particles which would have been able to adhere to the wall.

The movements of translation and rotation can be integral or otherwise; they can be combined with a helicoidal movement, if the rod of the piston carries a thread, which would not have contact with the material, and which will be movable in a body constituting a nut fast to the fixed frame. One can control one or the other movement separately or otherwise by any mechanical means or any source of energy. By way of example, manual force, lever, hand wheel, inertia of a wheel in rotation, counterweight, reduction gearing, rack means, connection rod, pressure of a compressed fluid, steam, electricity, decomposition of a chemical product, etc. In particular one can collect the pressure of the piston by a hydraulic press, pressing on the piston of the apparatus by means of a ball bearing, this piston being put into rotation by a motor which progresses with it.

Figure 3:
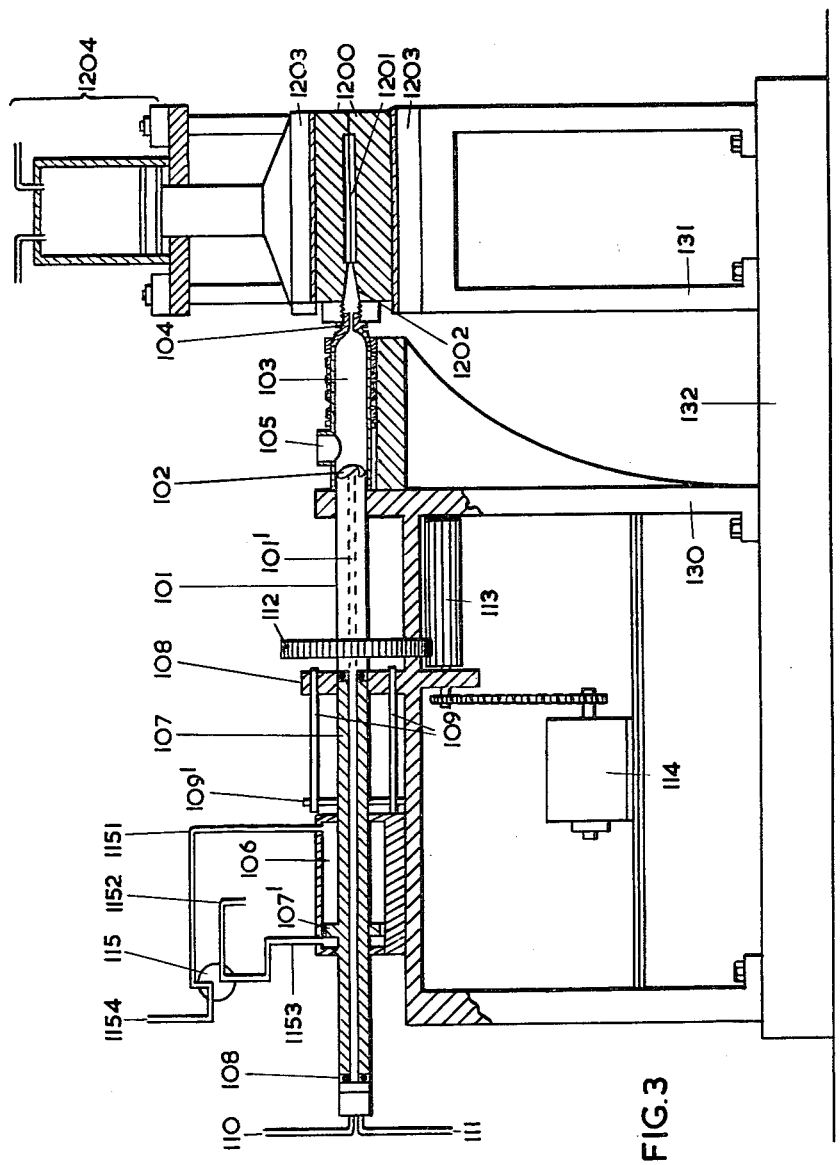
FIG. 3 is a diagrammatic elevation of an assembly comprising the injection machine, and a hydraulic press of known construction to keep the mould closed as long as the mould is full.
Figure 6:
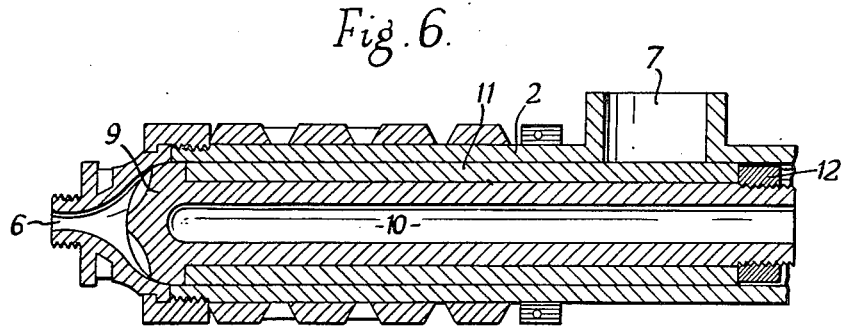
FIG. 6 is a central vertical section showing the piston of FIG. 2 in operative position within the cylinder of FIG. 1.

In FIG. 3, the injecting piston 101, with its passage for cooling fluid 101' and its notched head 102, is axially disposed in a compression chamber 103. Said chamber has an outlet nozzle 104 connected with the mould 1200. In the rear part of the chamber is an opening 105 for charging. The lengthwise motion of the piston 101 is obtained in this example by a hydraulic ram comprising a hydraulic cylinder 106, and a piston 107' fastened on a piston shaft 107. This shaft moves the injecting piston 101. The hydraulic cylinder is connected to a fluid pressure feed system by means of a regulator which receives the fluid by a pipe 1154 and sends either on the one side of the piston 107' by the pipe 1151, or on the other side by the pipe 1153, or emptying from the cylinder by the pipe 1152. The shaft of the hydraulic piston 107 does not revolve; it is held and guided by the rods 109 and the member 109' fastened on the piston 107.

The injecting piston is set into rotation by means of a motor 114, with built-in reduction gear, which drives a transferring-pinion 113 driving a wheel 112 fastened on the piston 101. In this way, the revolving of the piston 101 is ensured along its whole run. The piston 101 is moved along by the shaft 107 by means of a hollow shaft which allows the cooling fluid to come up to the front part of the piston head. The hollow shaft of the piston 101 is shown in FIG. 1 only schematically; said shaft revolves inside the hydraulic shaft by means of the ball bearings 108. At the rear part of the hollow shaft of the piston 101, a stuffing glad allows the cooling fluid to enter from 110 into the piston 101, and to go out by 111.

Heating and cooling means for the cylinder 103 are shown at 103a. The piston 101 has a cooling channel as shown in FIG. 2. 130, 131 and 132 are parts of a supporting frame. In the press at the right hand side in this drawing, 1200 is a mould, 1201 is its cavity. 1202 is the passage for injecting the material into the cavity. 1203 is the heating plates of known kind. 1204 is a hydraulic ram for this press, of known kind.

In FIGS. 4 and 5, the piston head has spiral lands 21, separated one from another by helicoidal grooves. In this example, 22 is the line where the cylindrical lateral wall of the piston stops. The dotted line 25 shows the bottom of the helicoidal grooves. The arrow 23 shows the revolving of the piston, relative to the shape of the lands and grooves in the example.

The operation is as follows:

That material is previously brought to a plastic condition, so as to flow readily under a low thrust. Such a condition is for example the one of a usual rubber compound, filled with mineral fillers but no carbon black, at about 160° F. The injection is easier at higher temperatures, as for example, 210, 230 or 250° F., if the compound allows it. The plastic state is easily obtained by common heating means, for example by means of high frequency electric waves, or of milling on a heated mixing machine, or of heating in an oven as a sheet of about .1″ thickness, or of extruding through a known extruding machine. In this case, the outlet of the extruding machine will be wide, and possibly fitted with a sifter, heated by induction, so as to heat the material in its internal parts. The run of the extruding machine may be continuous so that no material will be kept still and overheated; further the plastic material may be extruded in the shape of a round bar, of diameter adapted to the diameter of the compression chamber 103.

The material in a plastic condition is charged through the opening 105 into the chamber 103. The piston 101 revolves continuously and is propelled by the hydraulic ram while revolving. The material is conveniently fluid, and flows readily through the nozzle 104. It enters the mould cavity 1201, assumes its shape, and is there cured in known manner.

A strict condition for good operation is that the material in a plastic condition will not creep or leak into the minute clearance between the piston and the cylinder wall. For this purpose:

(a) The piston revolves.
(b) The piston is cooled.
(c) The piston head has a special shape.

The piston is conveniently cooled to cause a layer of the injecting material, in contact with the head-end, to become relatively stiffer than the remainder of the injecting material in the cylinder, and thus to form a sliding seal with the cylinder wall. The material of this seal is permanently renewed with cold material by the revolving. Experience has shown that the obtained seal can sustain as high pressures as 10,000 lb./sq.i.

Figure 7:
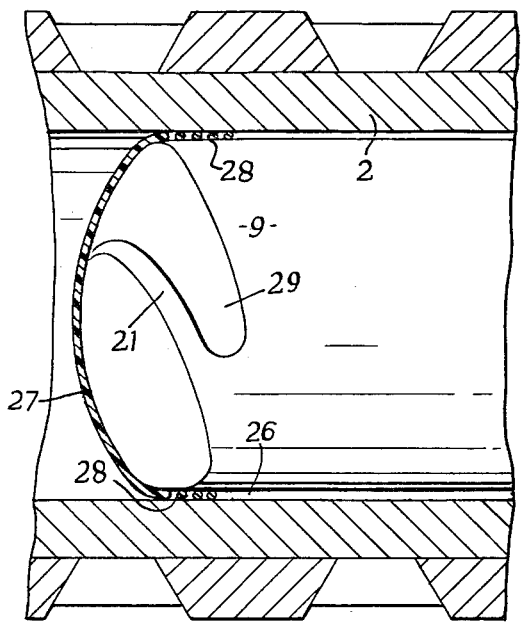
FIG. 7 is a central vertical section, to a larger scale of part of the piston and cylinder, to show collection of material and formation of the seal between the piston and cylinder.

For the purpose of facilitating illustration of this seal, the clearance between the wall of the piston and the wall of the cylinder has been shown disproportionally wide in FIG. 7. Across the head end of the piston, and extending into the beginning of the clearance 26, as a layer 27 of the injection material which has become cooled and hardened as a result of cooling the piston, the portion of said layer between the wall of the piston and cylinder serving as a sliding seal between the two.

In the cases where particles of the injecting material creep or leak into the minute clearance between the piston and the cylinder wall, these particles are cooled by the piston. They become stiff and elastic and are then broken in small rolls which roll between the piston and the cylinder wall, at an angular speed about the half that of the piston. Thus, they finally fall after a short time into the cavity of one of the grooves in the lateral surface of the piston. These cavities remain empty because the stiff material at the contact of the lands cannot enter them. The helicoidal slopes of the grooves gather the small rolls of stiff material and thrust them into the mass of the injecting material in the compression chamber 103.

This action is shown in FIG. 7, wherein material trapped between the wall, near the head end of the piston, and the wall of the cylinder is represented as small sausage-like rolls 28. It will be apparent that, during rotation of the piston, the rolls 28 will eventually pass into one or other of the grooves 29. The direction of rotation of the piston is such that any such rolls 28 passing into the grooves are thrust axially back into the mass of injection material ahead of the piston.

As the material is plastic, its thrusting occurs under relatively low pressures compared with the known machines.

As an example, it is possible to inject a known rubber compound, as above described, with a pressure of only 40 lb./sq.i., through a nozzle of .25″ to .5″ diameter. However, it is preferred, because of technical grounds, to use higher pressures, such as 140 to 430 lb./sq.i. This is still much lower than the ten thousand lb./sq.i. ordinarily used. The pressure is easily controlled by setting the diameter of the nozzle which is inter-changeable. The diameter of the nozzle may be calculated by means of the following equation $$D^4 \cdot P = k \cdot V^2$$

where D is the diameter of the nozzle in inches, P is the injection pressure in lb./sq.i., calculated from the power of the ram and from the diameter of the piston 101; V is the output in cu.i./sec.; $k$ is a coefficient which is to be determined by experience, and is 5 for the above rubber compound when the compound is heated to 250° F., and 45 at 160° F.

In this manner the present invention allows to inject any quantity of any material in a plastic state, and especially of rubber, into any mould of any content or shape, and to do this rapidly through a nozzle as wide as desired. Any mould can be filled within a time of from 10 to 20 seconds.

I claim:

1. In an injection molding machine, for use with thermosetting materials in a flowable state, an operating cylinder having a charging opening at one end and an outlet nozzle at the other end adapted for engagement with a mold, a single piston slidable within and forming a clearance fit with the cylinder wall, the head end of said piston being reciprocable between axial positions at each side of the charging opening of said cylinder, said piston having on its head a plurality of symmetrical helicoidal lands shaped so as to define between them a plurality of grooves which extend from a point on the circumferential wall of the piston spaced from its head end, inwardly and towards the head end of the piston, to meet at a point on the axis of the piston at the head end thereof, the piston shaft being substantially smooth rearward of the piston head, means for charging said material in a flowable state into the charging opening of the cylinder while the piston is in its back position so as to free the charging opening, means externally on the wall of the cylinder for selectively heating and cooling the wall of the cylinder as necessitated by the nature of the material being injected, means for reciprocating the piston with respect to the cylinder, and means coupled to said reciprocating means for revolving the piston with respect to the cylinder during the reciprocation of the piston in a direction of motion contrary to that of the grooves, thereby to tend to form any injection material, which may become separated from the mass in the cylinder and pass into the clearance between the head end of the piston and the cylinder wall into rolls having a diameter corresponding to the width of said clearance, and thereby further to cause any such rolls of injection material to rotate with respect to the piston head in the clearance and to be eventually collected in those parts of the grooves removed from the piston head and to be returned along said grooves into the mass of injection material in the cylinder.

2. In an injection molding machine as claimed in claim 1, means for cooling the head end of the piston, thereby to cause a layer of injection material in contact with the head end to become relatively stiffer than the remainder thereof and to form a sliding fit with the cylinder wall.

References Cited in the file of this patent

UNITED STATES PATENTS

| | | |
|---|---|---|
| 2,296,295 | Shaw | Sept. 22, 1942 |
| 2,629,132 | Millcox et al. | Feb. 24, 1953 |
| 2,734,226 | Willert | Feb. 14, 1956 |
| 2,890,491 | Hendry | June 16, 1959 |

FOREIGN PATENTS

| | | |
|---|---|---|
| 898,805 | Germany | Dec. 3, 1953 |
| 1,143,153 | France | Sept. 27, 1957 |